United States Patent [19]

Jordan

[11] Patent Number: 5,943,863
[45] Date of Patent: Aug. 31, 1999

[54] CENTER PORT COMPENSATION VALVING FOR A MASTER CYLINDER

[75] Inventor: David D. Jordan, South Bend, Ind.

[73] Assignee: Robert Bosch Technology Corporation, Broadview, Ill.

[21] Appl. No.: 08/961,464

[22] Filed: Oct. 31, 1997

[51] Int. Cl.$^6$ .................................................. B60T 11/20
[52] U.S. Cl. ............................................. 60/562; 60/589
[58] Field of Search ...................................... 60/562, 589

[56] References Cited

U.S. PATENT DOCUMENTS

| | | | |
|---|---|---|---|
| 4,417,445 | 11/1983 | Furata | 60/554 |
| 5,056,313 | 10/1991 | Venetos et al. | 60/562 |
| 5,477,681 | 12/1995 | Tackett | 60/562 |

*Primary Examiner*—Sheldon J. Richter
*Attorney, Agent, or Firm*—Leo H. McCormick, Jr.; Warren Comstock

[57] ABSTRACT

A master cylinder (12) for use in a brake system. The master cylinder (14) has a housing (22) with a bore (20) therein connected by a radial port (28) and an axial port with a reservoir (32) and to the brake system through first (34) and second (36) outlet ports. First (42) and second (44) pistons located in the bore (20) are separated by a first resilient means (46) to define a first chamber (50) while the second piston (44) is separated from the bottom (21) of the bore (20) by a second resilient means (48) to define a second chamber (52). The first and second resilient means (46,48) each include a first spring (90) which is caged between a first retainer (94) and a second retainer (96) by a linkage member (98) and a second spring (92). The linkage member (98) has a head (126) which engages the first retainer (94) and an end (128) which engages the second retainer (96) to hold the first spring (90) between the first (94) and second (96) retainers. The first chamber (50) is connected to the radial port (28) through an axial passage (76) in the second piston (44) while the second chamber (52) is directly connected to the axial port in the housing (22) to communicate fluid between the reservoir (32) and the bore (20). The first (42) and second (44) pistons respond to an input force by initially moving within the bore (20) to compress the first springs (90,90') of the first (46) and second (48) resilient means and allow the second springs (92,92') to move heads (126,126') of the linkage members (98,98') into respective engagement with the second piston (44) to seal axial passage (76) and the axial port of the housing (22) to terminate communication between the bore and the reservoir.

17 Claims, 2 Drawing Sheets

CENTER PORT COMPENSATION VALVING FOR A MASTER CYLINDER

This invention relates to caging means which separate first and second pistons located in a bore of a master cylinder and first and second valves respectively associated therewith for controlling communication between a reservoir and the bore.

BACKGROUND OF THE INVENTION

U.S. Pat. Nos. 5,018,353 and 5,111,661 disclose master cylinders wherein compensation between a first chamber in a bore of a housing and a reservoir occurs through a single center port compensation valve associate with a first piston and between a second chamber in the bore through a relationship established between a radial port and sealing structure carried on a second piston. In order to eliminate the possibility of cutting a nub in a seal by extrusion into the radial port, U.S. Pat. Nos. 5,207,062 and 5,279,125 disclose the use of a second center port compensation valve through which compensation is achieved for the second operational chamber in a bore. In master cylinders having such separate compensation valves for the first and second pressurizing chambers in the bore communication typically occurs through ports from separate passages in the housing when the first and second pistons are in a rest position. As the first and second pistons approach the rest position, stop pins engage the compensation valves to open the compensation valve and initiate communication between the reservoir and bore. Unfortunately, the passage required the rear piston is quite long as the compensation port needs to be located adjacent the end of the housing for the master cylinder. In addition, when such master cylinders are recessed into a front chamber of a vacuum brake booster care needs to be taken with respect to sealing structure to assure that vacuum does not draw fluid into the vacuum brake booster.

SUMMARY OF THE INVENTION

A primary object of the present invention is to provide a brake system with caging means having first and second valves and which separate first and second pistons located in a bore of a master cylinder to control communication through a first center port in the second piston while and an axial port in the housing to communicate fluid from a reservoir and the bore when the first and second pistons are in a rest position.

According to this invention, a brake system is equipped with a master cylinder having a housing with a bore therein which is connected by a radial port and an axial port with a reservoir and to the brake system through first and second outlet ports. First and second pistons are positioned in the bore by a first resilient means located between the first and second pistons to define limits for a first chamber and by a second resilient means located between the second piston and the bottom of the bore to define limits for a second chamber. The first and second resilient means each include a first spring and a second spring. The first spring is caged between a first retainer and a second retainer by a linkage member. The linkage member has a head which engages the first retainer and an end which engages the second retainer to hold the first spring between the first and second retainers. The second spring is located between the head and the first retainer member. The first chamber is connected to the radial port through an axial passage in the second piston while the second chamber is connected to the axial port in the housing. The first and second pistons respond to an input force applied to the first piston by initially moving within the bore to compress the first springs of the first and second resilient means and allow the second springs to simultaneously move the head of the linkage member of the first resilient means into engagement with the axial passage of the second piston and the head of the second linkage member of the second resilient means into engagement with the axial port of the housing to terminate communication between the bore and the reservoir. Further movement of the first and second pistons by the input force pressurizes fluid in the first and second chambers to provide pressurize fluid to the brake system through the first and second outlet ports and effect a brake application.

An advantage of this brake system is provided by a utilizing a head of a linkage component for a caging member as a poppet for a compensation valve to control communication between a reservoir and the bore of a master cylinder.

A still further advantage of this invention is provided by moving a compensation port for communication between a reservoir and a bore away from an end of the housing to simplify seals necessary to retaining fluid in a bore.

Another advantage the caging means offer occurs since the pistons are entirely contained in within the bore of the master cylinder and by connecting the compensation passage for the rear chamber through the second piston the distance required move the first piston to seal the first chamber is reduced.

DETAILED DESCRIPTION

Figure 1:
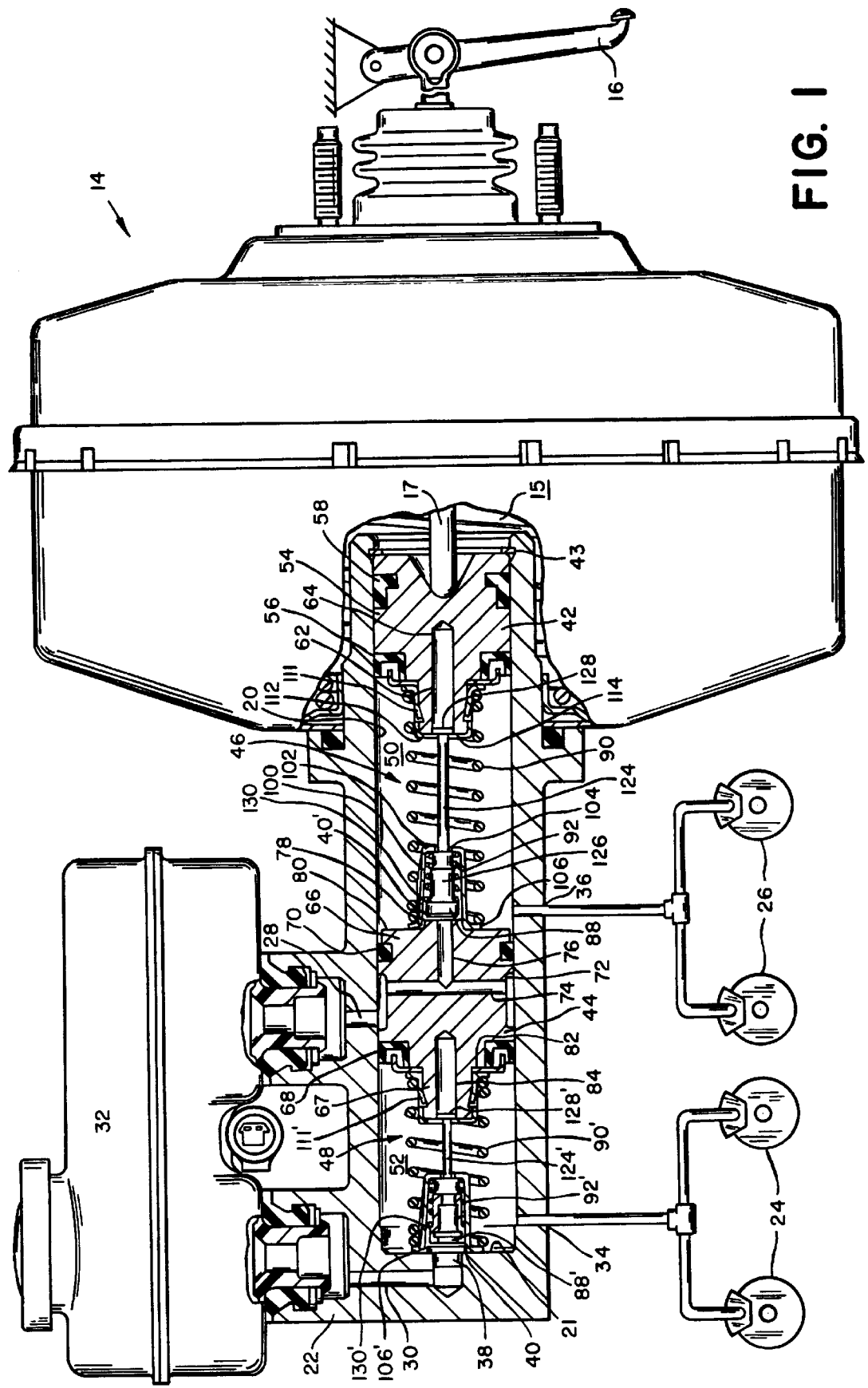
FIG. 1 is a schematic illustration of a brake system with a sectional view of a master cylinder having caged first and second resilient means for positioning pistons within a bore in accordance with the principals of this invention where heads for first and second linkage members function as poppets to seal corresponding compensation ports and allow movement of the pistons to develop pressurize fluid to effecting a brake application.

The brake system illustrated in FIG. 1 includes a master cylinder 12 which is inserted into a front chamber of a vacuum brake booster 14. The brake booster 14 receives an input force from brake pedal 16 to provide master cylinder 12 with an actuation force which moves first 42 and second 44 pistons located in bore 20 of housing 22 to provide the front 24 and rear 26 wheel brakes with pressurized fluid to effect a brake application.

In more detail, master cylinder 12 has a housing 22 with a bore therein. Bore 20 is connected by a radial port 28 and axial port of radial passageway 30 to a reservoir 32 and to the front 24 and rear 26 wheel brakes through outlet ports 34 and 36. An orifice member 38 is located in axial port 30 to provide a seat 40 for a poppet of a center port compensation valve, as hereinafter described. First 42 and second 44 pistons are positioned in bore 20 by first 46 and second 48 resilient means to define a first chamber 50 and a second chamber 52.

The first piston 42 has a cylindrical body 54 with grooves therein for retaining first 56 and second 58 seals to seal bore 20 from the surrounding environment, an axial depression for receiving head on an output push rod 17 from the vacuum brake booster 14 and a projection 62 with an axial bore 64 therein.

The second piston 44 has a cylindrical body 66 with grooves for receiving seals 68 and 70 and a compensation groove 72 connected by an passage 74 with an axial passage 76. An annular projection 78 on face 80 of the cylindrical body 66 surrounds axial passage 76 to provide a seat 40' for a center port compensation valve as hereinafter described. An annular projection 67 which extends from face 82 on piston 44 has an axial bore 84 therein.

The first resilient means 46 is located in bore 20 between the first 42 and second 44 pistons to define the limits for the first chamber 50 while the second resilient means 48 is located between the bottom 21 of bore 20 and the second piston 44 to define the limits for the second chamber 52. The length of the first 46 and second 48 resilient means is such that radial port 28 is aligned with compensation groove 72 of piston 44 and as a result passages 74 and 76 are always connected with reservoir 32.

The first 46 and second 48 resilient means are essentially identical in structure and functional operation. Only the first resilient means 46 will be described in detail and where necessary to understand the operation of the invention similar components of the second resilient means 48 will be identified with the same number plus'.

Figure 2:
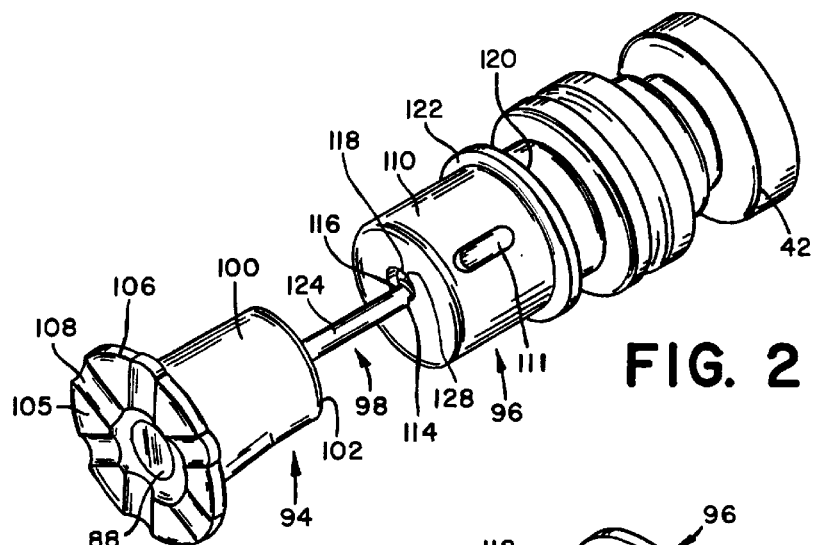
FIG. 2 is a perspective view of a resilient means for the master cylinder FIG. 1 having a first retainer, a linkage member and a second retainer positioned on a piston.
Figure 3:
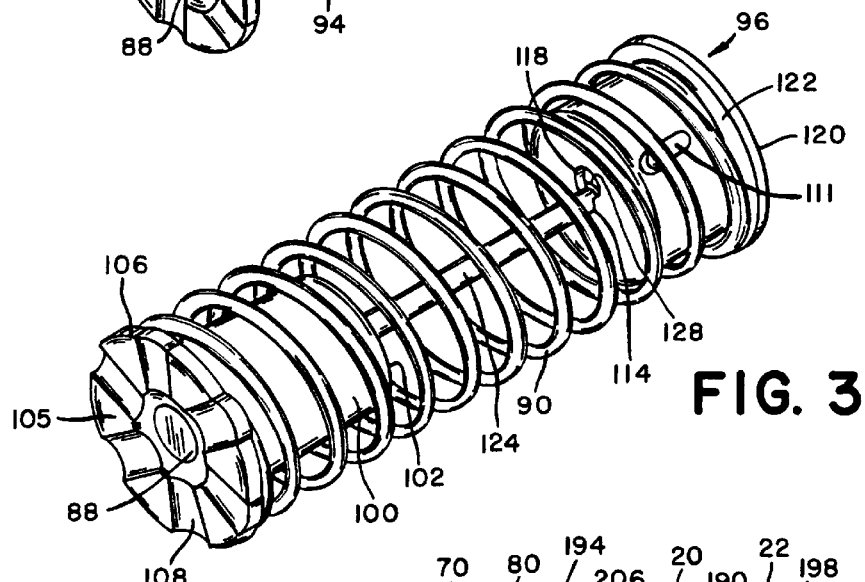
FIG. 3 is a perspective view of the resilient means of FIG. 2 with a first spring caged between the first retainer and second retainer.

The first resilient means 46 as illustrated in FIG. 1 in bore 20 of the master cylinder 14 and in a prospective view of FIGS. 2 and 3, includes a first spring 90 and a second spring 92. The first spring 90 is caged between a first retainer 94 and a second retainer 96 by a linkage member 98.

The second spring 92 which is located between the first retainer 94 and head 126 of linkage member 98 functions to urge a poppet 88 on head 126 toward a seat 40' to control communication between bore 20 and reservoir 32.

The first retainer 94 has a cylindrical cone or body 100 which extends from a base 102 to define a first cup. The base 102 has an axial opening 104 while the cylindrical body 100 has an outward peripheral flange 106 an end 105 thereof. The end 105 has a face with an undulating surface 108 which allows for unrestricted flow of fluid along face when end 105 engages another member.

The second retainer 96 has a cylindrical cone or body 110 which extends from a base 112 to define a second cup. The base 112 has an axial opening 114 connected by a slot 116 to a larger diameter offset opening 118. The cylindrical body 110 has an end 120 with a peripheral flange 122 for positioning retainer on a projection which extends from a piston to align the second retainer 96 within bore 20.

The linkage member 98 has a stem 124 with a head 126 which engages base 102 the first retainer 94 and an end 128 which after passing through axial opening 104 in retainer 94 and offset opening 118 in retainer 96 is shifted to axial opening 114. End 128 of stem 124 has a larger diameter that opening 114 and as a result will engage base 112 to cage the first spring 90 between the first 94 and second 96 retainers.

The head 126 of stem 124 defines a poppet for a center port compensation valve. Head 126 has a cylindrical body with a rib 130 which the second spring 92 located on base 102 of the first retainer 94 engages to urge face 88 toward a seat 40.

The first 46 and second 48 resilient means are manufactured as a sub-assembly in the following manner.

Spring 92 is placed on stem 124 of linkage member 98 and brought into engagement with rib 130. Thereafter end 128 is moved through axial opening 104 of the first retainer 94. Spring 90 is placed on peripheral flange 106 of the first retainer 94. The peripheral flange 122 of the second retainer 96 is thereafter brought into engagement with spring 90. The first retainer 94 and head 126 of stem 124 are held stationary as a compressive force is applied to the second retainer 96 sufficient for end 128 to pass through offset opening 118. After passing through offset opening 118, end 128 is rotated and moved through slot 116 into axial opening 114. End 128 has a larger diameter than axial opening 114 and when the compressive force is removed, spring 90 is caged between the first 94 and second 96 retainers.

The first 46 and second 48 resilient means are identical and can now be attached to the first 42 and second 46 pistons for assembly in a master cylinder 14. Assembly to the first 42 and second 46 pistons is identical and occurs in the following manner, The second retainer 96 is moved onto a projection (62 for piston 42 and 67 for piston 46) and tabs 111, 111' deformed into a groove (groove 43 for piston 42 and groove 45 for piston 46) to secure the resilient means to a piston.

Thereafter, the second piston 46 is inserted into bore 20 with face 105 of resilient means 48 engaging the bottom of bore 20 with flange 106' surrounding orifice 38. Seal 68 on the second piston 46 engages bore to seal chamber 52 from radial port 28 to define chamber 52. The first piston 44 is now inserted in bore 20 with flange 106 on retainer 94 surrounding projection 78 on face 80 of the second piston 46 and seal 56 engaging bore 20 to define chamber 50. A slight compression force is applied to the end the first piston 42 and snap ring 43 inserted in groove 21 to retain the first piston 42 in bore 20.

In the rest position illustrated in FIG. 1, fluid from reservoir 32 is freely communicated to chamber 52 by way of axial port of radial passageway 30 while fluid is communicated to chamber 50 by way of radial port 28, groove 72, passage 74 and axial passage 76. It should be understood that fluid freely flows to chambers 50 and 52 along undulations 108 on the faces 105,105' of the first retainers 94,94'. Because of the location of the radial port 28 and the communication of fluid through the second piston 46 to chamber 50, the housing 20 of the master cylinder 14 can be inserted into the front chamber 15 of the booster housing 13 to create a compact unitary structure. Further with the such communication paths, the design of seals 56 and 58 on piston 42 are simplified as the fluid in chamber 50, with piston 42 in the rest position as illustrated in FIG. 1, is not under pressure and the stress placed thereon by vacuum available in chamber 15 is limited.

When the master cylinder 12 and booster 14 is installed in a vehicle and a brake application is desired, an input force applied to brake pedal 16 operates the brake booster to create an output force which is communicated through push rod 17 to the first piston 42. Initially such output force simultaneously moves pistons 42 and 44 to compress springs 90,90' and allow springs 92,92' to move faces 88,88' on heads 46,46' into engagement with and seat on projection 78 and 40, respectively, to seal chambers 50 and 52. Thereafter, further movement of piston 42 by the input force causes the development of fluid pressure which is compacted through ports 34 and 36 to effect a brake application. When the brake application is completed, the output force from push rod 17 acting on the first piston 42 ceases and springs 90,90' expand to move the linkages 98,98' back into engagement with the first 94,94' and second 96,96' retainers. As springs 90,90' expand, springs 92,92' are compressed to move ends 88,88' away from seats 40,40' to again establish communication between the reservoir 32 and chambers 50 and 52 allow any need fluid to flow and maintain the fluid level in the brake system at capacity.

Figure 4:
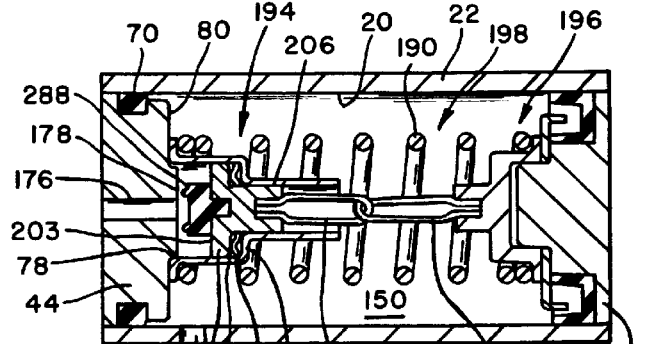
FIG. 4 is a sectional view of another resilient means having linkage member wherein first and second links which are joined, together to cage a spring between first and second retainers.

For some applications it may be desirable to replace the linkage member 98 as illustrated in FIG. 1 with linkage 198 as shown in FIG. 4 wherein a first link 200 is joined with a second link 202. The first link 200 is connected to a first retainer 194 while the second link 202 is connected the second retainer 196 to cage spring 190. The first link 200 is connected to the first retainer 194 through a cylindrical member 204 which is retained in the body 206. A wave spring 192 is located between a shoulder 208 on the cylindrical member 204 and a shoulder 205 on body 206. A popped member 288 is located on face 203 of the cylindrical member 204. The functional operation of a master cylinder with resilient means having linkage 198 would be as follows. An input force applied to piston 142 would initially compress spring 190 which would allow wave spring 192 to move poppet member 288 into engagement with seat 178 on the second piston 146 and terminate communication between axial passage 176 to thereafter allow further movement of piston 142 to pressurize fluid in chamber 150 and supply a brake system with pressurized fluid through outlet port 136. When the input force on piston 142 terminates, spring 190 expands and pulls cylindrical member 204 toward shoulder 205 to again allow fluid to be communicated from reservoir 32 to chamber 150 and compensate the system with any fluid which may be lost.

Figure 5:
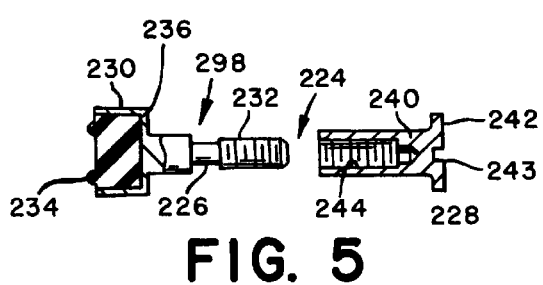
FIG. 5 is a sectional view of another linkage member for a resilient means.

FIG. 5 is another illustration of a linkage member 298 having a stem 224 which is comprised of a first component 226 and a second component 228, The first component 226 has a cylindrical body 230 with a shaft 232. A resilient member or poppet 234 is retained in a blind bore 236 of the cylindrical body 230 while shaft 232 is threaded. The second component 228 has a cylindrical body 240 with a head 242 thereon. Bore 244 in cylindrical body 240 is threaded and designed to receive shaft 232. The first component 226 is located in and extends through an axial opening in a first retainer 94 and after spring 90 is compressed the second component is placed on the second retainer 96 to bring the threaded surfaces on shaft and cylindrical body 240 into engagement. Rotation of head 242 by a torque applied through slot 243 allows the first component 226 to be joined to the second component 228. In such an arrangement the key hole opening in the second retainer 96 is replaced by a simple circular opening which has a diameter slightly smaller than the diameter of head 242.

Figure 6:
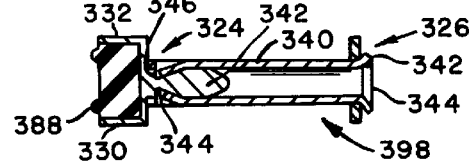
FIG. 6 is a sectional view of a further linkage member for a resilient means.

FIG. 6 is still another illustration of a linkage member 398 having a first component 324 and a second component 326. The first component 324 has a cylindrical body 330 with a head 332 which retains a resilient or poppet member 388 and a shaft 342. Shaft 342 has a spherical shape with a groove 344. The second component 326 is a cylindrical sleeve 340 with a head 342 on a first end 344 and a second end 346. After compression of a spring 90 sleeve 340 is moved through axial opening in the second retainer into engagement with shaft 342. The sleeve 340 is joined to shaft 342 by distorting end 346 into groove 344 to cage spring 90 between a first retainer and a second retainer.

I claim:
1. A master cylinder (12) for use in a brake system having a housing (22) with a bore (20) therein, first (42) and second (44) pistons being located in said bore (20) by first (46) and second (48) resilient means to define limits for a first chamber (50) and a second chamber (52), said first (50) and second (52) chambers being connected to a reservoir (32) to receive fluid and maintain the fluid level in said brake system at a desired level and being connected to front (24) and rear (26) wheel brakes to supply pressurized fluid to effect a brake application, said communication of fluid from said reservoir (32) being controlled by first and second center port compensation valves, each of said first and second center port compensation valves being characterized by a head (126,126') carried by a linkage member (124,124') which joins a first retainer (94,94') with a second retainer (96,96') of the first (46) and second (48) resilient means to cage a spring (90,90'), said head (126,126') being urged into engagement with a seat (40,40') to terminate communication from said reservoir (32) on compression of said spring (90,90) in response to an input force applied to said first piston (42) to initiate a brake application.

2. The master cylinder (12) as recited in claim 1 wherein said linkage member (124,124') is further characterized by first (200) and second (202) links for joining said first retainer (94,94') with said second retainer (96,96').

3. The master cylinder (12) as recited in claim 1 wherein said linkage member (124,124') is further characterized by a first component (226) and a second (228) component which are threaded together to join said first retainer (94,94') with said second retainer (96,96').

4. The master cylinder (12) as recited in claim 1 wherein said second piston (44) is characterized as having a passage (74,76) through which said first chamber (50) is connected to said reservoir (32).

5. The master cylinder (12) as recited in claim 4 is further characterized by the communication of compensation fluid from said reservoir (32) to said second chamber (52) through an axial port in said housing (22).

6. A master cylinder for use in a brake system, said master cylinder comprising:

a housing with a bore therein connected by a radial port and an axial port with a reservoir and through first and second outlet ports to said brake system;

a first piston located in said bore;

a second piston located in said bore;

first resilient means located in said bore between said first and second pistons to define a first chamber, said first resilient means having a first spring and a second spring, said first spring being caged between a first retainer and a second retainer by a linkage member, said linkage member having a head which engages said first retainer and an end which engages said second retainer to cage said first spring between the first and second retainers, second spring being located between said head and said first retainer member, said first chamber being connected to said reservoir through said radial port in said housing and an axial passage in said second piston; and second resilient means located in said bore between said second piston and a bottom of said bore to define a second chamber, said second resilient means having a first spring and a second spring, said first spring being caged between a first retainer and a second retainer by a linkage member, said linkage member having a head which engages said first retainer member and an end which engages said second retainer to cage the spring between the first and second retainers and a second spring located between said head and said first retainer member, said second chamber being connected to said reservoir through said axial port in said housing, said first and second pistons responding to an input force by initially moving within said bore to compress said first springs of said first and second resilient means and allow said second springs to move said heads of said linkage members into respective engagement with said axial passage of said second piston and said axial port of said housing to terminate communication between said bore and said reservoir and thereafter move to pressurize fluid in said first and second chambers to provide pressurize fluid to said brake system through said first and second outlet ports.

7. The master cylinder as recited in claim 6 wherein said first retainer of said first and second resilient means each includes:

a first cylindrical body extending from a base to define a first cup, said base having an axial opening while said cylindrical body has an end with a peripheral flange, said end having a face with an undulating surface, said undulating surface allowing for free communications of fluid along said face.

8. The master cylinder as recited in claim 7 wherein said second retainer of said first and second resilient means each includes:

a second cylindrical body which extends from a base to define a second cup, said base having an axial opening connected to an offset opening, said cylindrical body having an end with a peripheral flange for positioning said second retainer within said bore.

9. The master cylinder as recited in claim 8 wherein said second retainer of said first and second resilient means each includes:

a second cup having a cylindrical body which extends from a base, said base having a peripheral flange thereon for positioning said second retainer in said bore.

10. The master cylinder as recited in claim 9 wherein said linkage member of said first and second resilient means each includes:

a cylindrical body having a first diameter surface separated from a second diameter surface by a shoulder, said second diameter surface extending through said opening in said first cup;

a first loop connected to said second diameter; and a second loop interconnected with said first loop and connected with said second cup to retain said first spring between said first and second retainers, said first and second loops allowing said first and second retainers to move toward each other as said first spring is compressed while said second spring acts on said shoulder to urge a face on said cylindrical body toward a seat to interrupt communication of fluid from said bore on movement of said first and second pistons.

11. The master cylinder as recited in claim 8 wherein said linkage member of said first and second resilient means each includes:

a stem having a cylindrical body with a first end and a second end, said head being located on said first end, said second end of said stem extending through said axial opening of said base of said first cup and said offset opening in said base of said second cup before radially moving in said second cup to position said stem in said axial opening where said second end engages said base.

12. The master cylinder as recited in claim 11 wherein said head located on each stem includes:

a cylindrical member with a rib on the peripheral surface thereof and a resilient poppet on the face thereof, said second spring engaging said rib to urge said poppet away from said first retainer.

13. The master cylinder as recited in claim 7 wherein said second retainer of said first and second resilient means each includes:

a second cup having a cylindrical body which extends from a base, said base having an axial opening, said cylindrical body having an end with a peripheral flange for positioning said second retainer within said bore.

14. The master cylinder as recited in claim 13 wherein said linkage member of said first and second resilient means each includes:

a stem having a cylindrical body with a first end and a second end, said head being located on said first end, said second end of said stem extending through said axial opening of said base of said first cup and said offset opening in said base of said second cup before radially moving said second cup, said second end being deformed to prevent said second end from thereafter passing back through said axial opening in said base of said second cup.

15. The master cylinder as recited in claim 13 wherein said linkage member of said first and second resilient means each includes:

a stem having a cylindrical body with a first end and a second end, said head being located on said first end, said second end of said stem extending through said axial opening of said base of said first cup and said offset opening in said base of said second cup before radially moving said second cup; and a fastener attached to said second end to prevent said second end from thereafter passing back trough said axial opening in said base of said second cup.

16. The master cylinder as recited in claim 13 wherein said linkage member of said first and second resilient means each includes:

a first component having a first cylindrical body with a shaft extending therefrom, a poppet member connected to said cylindrical body; and a second component having a second cylindrical body with a head thereon, said shaft being joined to said head through a threaded connection to cage said first spring.

17. The master cylinder as recited in claim 13 wherein said linkage member of said first and second resilient means each includes:

a first component having a cylindrical body with a shaft extending therefrom, a poppet member connected to said cylindrical body; and a second component having a sleeve with a head thereon, said sleeve having an end which is deformed to join said shaft with said sleeve and cage said first spring.

* * * * *